United States Patent
Goel et al.

(10) Patent No.: US 9,448,936 B2
(45) Date of Patent: Sep. 20, 2016

(54) CONCURRENT STORE AND LOAD OPERATIONS

(71) Applicant: Apple Inc., Cupertino, CA (US)

(72) Inventors: Rajat Goel, Saratoga, CA (US); Mridul Agarwal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 14/154,122

(22) Filed: Jan. 13, 2014

(65) Prior Publication Data

US 2015/0199272 A1    Jul. 16, 2015

(51) Int. Cl.
*G06F 12/08* (2016.01)

(52) U.S. Cl.
CPC ....... *G06F 12/0815* (2013.01); *G06F 12/0891* (2013.01)

(58) Field of Classification Search
CPC .......... G06F 12/0891; G06F 12/0871; G06F 12/0815
USPC ......................................... 711/133, 141, 146
See application file for complete search history.

(56) References Cited

U.S. PATENT DOCUMENTS

| | | | |
|---|---|---|---|
| 7,376,817 B2 | 5/2008 | Kadambi et al. | |
| 7,721,066 B2 | 5/2010 | Yeh et al. | |
| 8,239,638 B2 | 8/2012 | Gunna et al. | |
| 8,285,947 B2 | 10/2012 | Beaumont-Smith et al. | |
| 8,902,672 B2 * | 12/2014 | Iyer .......................... | G11C 8/16 365/189.04 |
| 2013/0339626 A1 * | 12/2013 | Alexander et al. ........... | 711/143 |
| 2014/0075158 A1 | 3/2014 | Indukuru et al. | |

* cited by examiner

*Primary Examiner* — Jasmine Song
(74) *Attorney, Agent, or Firm* — Rory D. Rankin; Meyertons, Hood, Kivlin, Kowert & Goetzel, P.C.

(57) ABSTRACT

Systems, processors, and methods for efficiently handling concurrent store and load operations within a processor. A processor comprises a load-store unit (LSU) with a banked level-one (L1) data cache. When a store operation is ready to write data to the L1 data cache, the store operation will skip the write to any banks that have a conflict with a concurrent load operation. A partial write of the store operation will be performed to those banks of the L1 data cache that do not have a conflict with a concurrent load operation. For every attempt to write the store operation, a corresponding store mask will be updated to indicate which portions of the store operation were successfully written to the L1 data cache.

17 Claims, 12 Drawing Sheets

CONCURRENT STORE AND LOAD OPERATIONS

BACKGROUND

1. Field of the Invention

This disclosure relates to microprocessors, and more particularly to techniques for supporting concurrent stores and loads in a processor.

2. Description of the Related Art

Modern out-of-order processors are often configured to execute load and store instructions out-of-order, and also permit loads to access memory in a speculative manner. Speculatively-executed loads and stores are typically held in queues until necessary criteria is met to make the loads and stores architecturally visible (i.e., visible to software). In a multi-processor environment, the order rules of memory accesses by various processors is defined by the memory consistency model specified by a given instruction set architecture (ISA). The weakly-ordered model is one such memory consistency model.

Modern microprocessors are typically coupled to one or more levels of a cache hierarchy in order to reduce the latency of the microprocessor's request for data in memory. The request may result from a read or a write operation during the execution of one or more software applications. Generally, a cache may store multiple cache lines, where a cache line holds several bytes of data in contiguous memory locations. A cache line may be treated as a unit for coherency purposes. In addition, a cache line may be a unit of allocation and deallocation in the cache. By having a unit of allocation and deallocation of several bytes in a cache, memory accesses may be more efficient and have a smaller latency than having a unit of one or a few bytes. As used herein, a "line" is a set of bytes stored in contiguous memory locations, which are treated as a unit for coherency purposes. As used herein, the terms "cache block", "block", "cache line", and "line" are interchangeable.

A load operation typically takes precedence over a store operation if a conflict exists between the two operations. However, delaying store operations which conflict with load operations can degrade processor performance. A "load memory operation" or "load operation" may refer to a transfer of data from memory or cache to a processor, and a "store memory operation" or "store operation" may refer to a transfer of data from a processor to memory or cache. "Load operations" and "store operations" may be more succinctly referred to herein as "loads" and "stores", respectively.

A load/store unit often includes a queue for buffering stores that are waiting to be written to the memory system. This queue may be dedicated to stores or alternatively, the queue may buffer both stores and loads. With loads taking precedence over stores, a large number of stores may be waiting in the queue at any given time. To accommodate a large number of stores, the size (i.e., number of entries) of the queue may be increased. Each entry in the queue often includes storage for data, address, and various read ports and cam ports. Accordingly, increasing the size of the queue can be expensive with respect to hardware requirements, timing impact, and power utilization.

SUMMARY

Systems, processors and methods for supporting concurrent load and store operations are disclosed.

In one embodiment, a processor pipeline may include a load-store unit (LSU), and the LSU may include at least a level-one (L1) data cache, a store queue, and a load queue. The L1 data cache may be structured to have a plurality of banks. The index portion of a generated address for a given load or store operation may be used to access one of these banks. The LSU may allow a partial store operation to the L1 data cache concurrently with a load operation in the same clock cycle.

In one embodiment, a first store operation may be buffered in the store queue. After the first store after has met memory ordering requirements, the first store may attempt to write to the L1 data cache. If there are no concurrent load operations trying to access the L1 data cache, then the store may complete the full write in this attempt. If there is a concurrent load trying to access the L1 data cache, then the store may skip the write to all banks of the cache that have a conflict with the load. The store may still write to the banks of the cache for which there is not a conflict with a load. This allows the first store to perform a partial write in the first attempt simultaneously with one or more loads.

After a partial write of the first store operation is performed, a store mask corresponding to the first store may be updated to indicate which portions of the first store were written in the first attempt. The first store may attempt to write the remaining portions to the cache in subsequent clock cycles, and if there are conflicts with other loads on these subsequent clock cycles, the first store may perform another partial write and update the store mask accordingly. On subsequent attempts, the first store will only attempt to write data which was not written to the cache in previous attempts.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
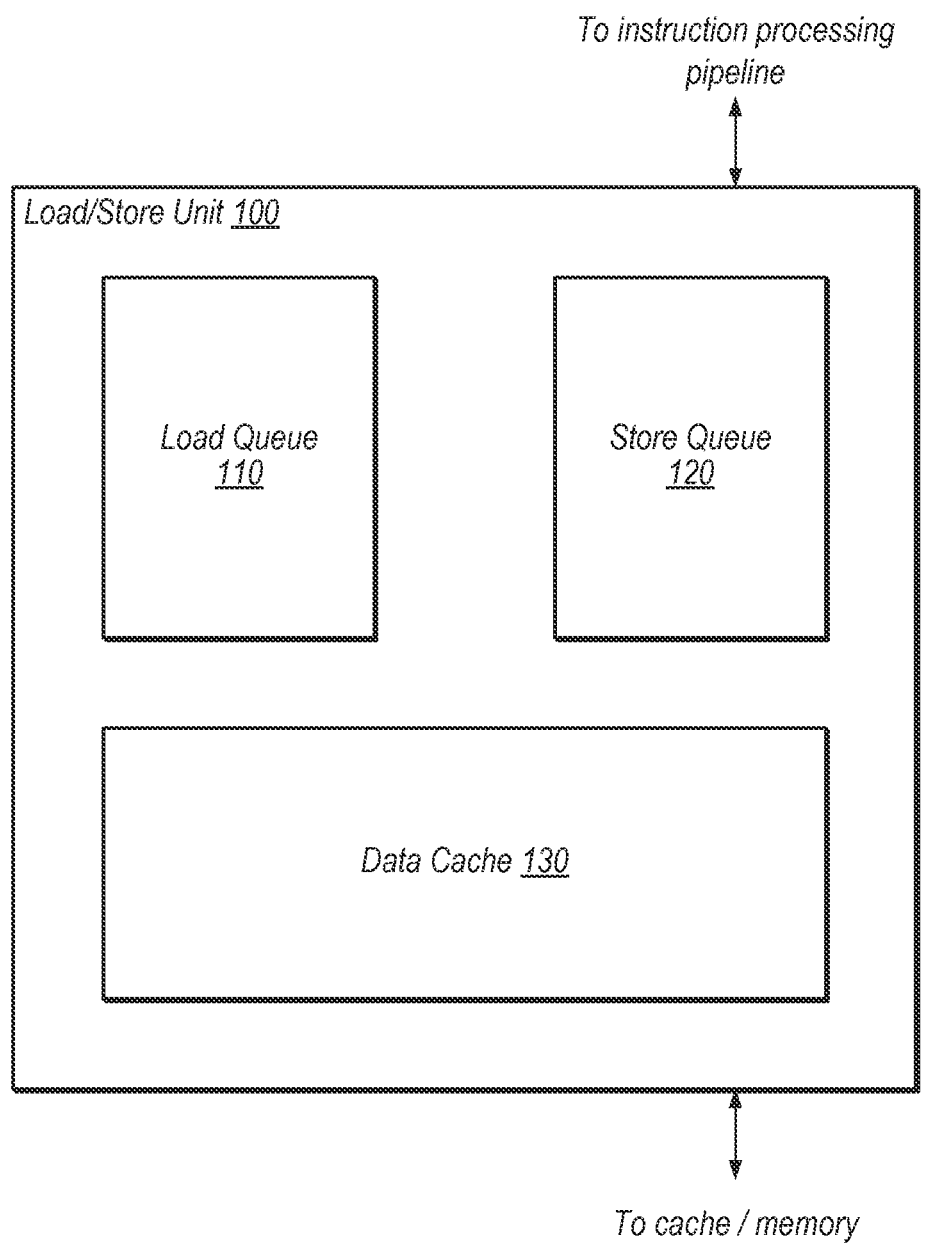
FIG. 1 is a block diagram that illustrates one embodiment of a load/store unit (LSU) in a processor.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a cache . . . . " Such a claim does not foreclose the processor from including additional components (e.g., a load-store unit, a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, the terms "first" and "second" operations can be used to refer to any two operations. Still further, the terms "first" and "second" cache lines can be used to refer to any two cache lines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a load/store unit (LSU) 100 in a processor is shown. In the illustrated embodiment, LSU 100 includes load queue 110, store queue 120, and data cache 130. In the illustrated embodiment, LSU 100 is configured to receive instruction information from an instruction processing pipeline (of which LSU 100 may be considered a part) and is coupled to a higher-level cache (relative to data cache 130) and/or a memory.

In one embodiment, load queue 110 includes multiple entries and is configured to store information associated with load instructions. It is noted that the terms "instruction" and "operation" may be used interchangeably herein. Load instructions stored in load queue 110 may be speculatively executed. Each entry in load queue 110 may include address information corresponding to the target location of a load, data associated with the load, and status information, for example.

Store queue 120 may similarly include multiple entries configured to store information associated with store instructions. Store instructions stored in store queue 120 may be posted stores. Posted stores may be retired from a completion unit of a processor, but may reside in store queue 120 while waiting to actually commit their data. Each entry in a store queue 120 may include address information corresponding to the target location of a store, data associated with the store, and status information, for example.

Load queue 110 and store queue 120 may be configured to queue instructions in program order. However, load and store instructions may be executed out of program order earlier in the processing pipeline. As used herein, the term "queue" refers to a storage element having a plurality of entries. Queues are often used to store data (e.g., data associated with instructions) while waiting for processing resources to become available or for particular events to occur. In some embodiments, queues are used to store instruction information in program order even though the instructions may be performed out of program order. Thus, queues do not always behave in a first-in-first-out (FIFO) manner. For example, if instruction information arrives out of program order but is removed in program order, the information may not be dequeued (or retired) in the same order in which it is enqueued. As used herein, the term "storage element" refers to any element configured to store one or more values in a volatile or non-volatile manner. Examples of storage elements include: registers, memories, latches, disks, etc.

Data cache 130 may be a level 1 (L1) data cache, for example. Data cache 130 may be a write-back or write-through cache. Data cache 130 may include a plurality of cache indices and ways. Data cache 130 may be indexed using index bits of a memory address and a matching way may be determined using tag bits of a memory address. Data cache 130 may be physically indexed and physically tagged, virtually indexed and virtually tagged, or virtually indexed and physically tagged. LSU 100 may be configured to fetch data from a higher-level cache or memory when there is a cache miss in data cache 130. LSU 100 may also be configured to maintain coherency with other processor cores. For example, when another processor core writes to a cache line that is resident in data cache 130, LSU 100 may evict or invalidate the cache line.

Data cache 130 may use banking as a way to present a multi-ported interface to the other logic in LSU 100. Banking refers to breaking down the total memory capacity of data cache 130 into smaller chunks called banks. Each bank can support a single transaction, either a load or a store. Multiple logical banks may be accessed in parallel to read/write independent addresses thereby giving an impression of multiple ports to interface logic.

In one embodiment, a load or store instruction may take the form shown below:

ST <size><datareg> [Address]
LD <size><datareg> [Address]

The operand <size> denotes the size in bytes of the access. For stores, <dataReg> is the register which contains the data to be written at [Address]. For loads, <dataReg> is the register where the data read out of [Address] needs to be sent.

In one embodiment, values from store instructions may not be committed to the memory system when they execute. Instead, the store instructions, including the memory address and store data, may be buffered in store queue 120 until they reach the commit point. At commit time, the store may be deemed to be safe to write to data cache 130 thereby avoiding any data hazards (e.g., write after read dependence, write after write dependence) where an earlier load receives an incorrect value.

Figure 2:
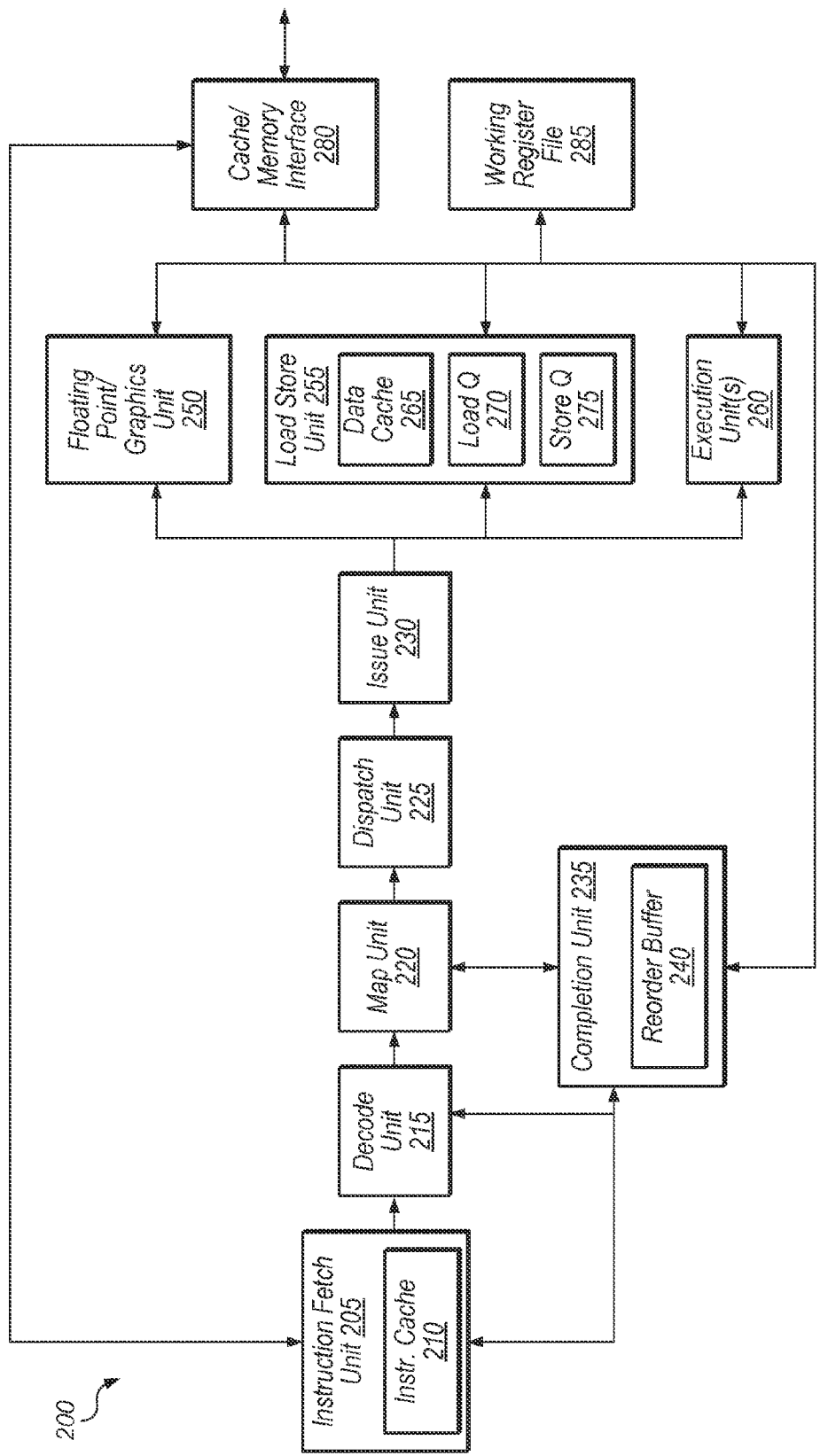
FIG. 2 is a block diagram that illustrates one embodiment of a pipeline of a processor.

Turning now to FIG. 2, a block diagram of a pipeline of a processor 200 is shown. Processor 200 is one example of a processor core, and processor 200 may be utilized within a processor complex, such as processor complex 312 of FIG. 3. In one embodiment, each of CPUs 314 and 316 of FIG. 3 may include the components and functionality of processor 200.

Processor 200 includes instruction fetch unit (IFU) 205 which includes an instruction cache 210. IFU 205 is coupled to an instruction processing pipeline that begins with a decode unit 215 and proceeds in turn through map unit 220, dispatch unit 225, and issue unit 230. Issue unit 230 is coupled to issue instructions to any of a number of instruction execution resources including execution unit(s) 260, load/store unit (LSU) 255, and/or floating-point/graphics unit (FGU) 250. These instruction execution resources are coupled to working register file 285. Additionally, LSU 255 is coupled to cache/memory interface 280. Completion unit 235 is coupled to IFU 205, map unit 220, working register file 285, and the outputs of any number of instruction execution resources.

In the following discussion, embodiments of each of the structures of the illustrated embodiment of processor 200 are described. However, it is noted that the illustrated embodiment is merely one example of how processor 200 may be implemented. Alternative configurations and variations are possible and contemplated.

Instruction fetch unit 205 may be configured to provide instructions to the rest of the pipeline for execution. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a load instruction refers to retrieving the value of the load's target location, which may, in some embodiments, be accomplished by a circuit at an execute stage of a pipeline (e.g., by a load/store unit). Conversely, "executing" the load instruction may refer to the entirety of operations that occur throughout the pipeline as a result of the load instruction. Instructions may be speculatively executed, and may be flushed and replayed if one or more conditions are not as speculated.

Further, as used herein, the term "target" in the context of load and store instructions refers to the location from which a load instruction should read or the location to which a store instruction should write. A target may be identified by a virtual address and/or a physical address. In some situations, instructions with the same target may not actually access the same storage element. For example, an older store may write information to a target location in a memory (or a cache) while a load reads from the target by forwarding the data from the store without accessing a cache or memory. In this exemplary situation the load and the store both target the same target location (e.g., using the same memory address), but do not use the same storage element to access the target location. Further, an instruction may "target" a cache line when it targets a location in the cache line. Also, snoops typically target a cache on a cache-line basis.

In one embodiment, IFU 205 is configured to fetch instructions from instruction cache 210 and buffer them for downstream processing, request data from a cache or memory through cache/memory interface 280 in response to instruction cache misses, and predict the direction and target of control transfer instructions (e.g., branches). In some embodiments, IFU 205 may include a number of data structures in addition to instruction cache 210, such as an instruction translation lookaside buffer (ITLB), instruction buffers, and/or structures configured to store state that is relevant to thread selection and processing (in multi-threaded embodiments of processor 200).

In one embodiment, decode unit 215 is configured to prepare fetched instructions for further processing. Decode unit 215 may be configured to identify the particular nature of an instruction (e.g., as specified by its opcode) and to determine the source and destination registers encoded in an instruction, if any. In some embodiments, decode unit 215 is configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" instruction or a conditional instruction for which the condition is false. An instruction may be defined by a given ISA. An instruction may also be defined by a microarchitecture rather than tied to a particular ISA. For example, decode unit 215 may be configured to decode an ISA instruction into one or more micro-operations, which may also be referred to as "instructions" when they specify an operation to be performed by a processor pipeline. Thus, a "load instruction" may or may not be defined by an ISA. A load instruction includes information indicative that a load operation is to be performed and typically includes information indicating a load's target memory location.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Register renaming may facilitate the elimination of certain dependencies between instructions (e.g., write-after-read or "false" dependencies), which may in turn prevent unnecessary serialization of instruction execution. In one embodiment, map unit 220 is configured to rename the architectural destination registers specified by instructions of a particular instruction set architecture (ISA) by mapping them to a physical register space, resolving false dependencies in the process. In some embodiments, map unit 220 maintains a mapping table that reflects the relationship between architectural registers and the physical registers to which they are mapped. Map unit 220 may also maintain a "free list" of available (i.e. currently unmapped) physical registers.

Once decoded and renamed, instructions may be ready to be scheduled for performance. In the illustrated embodiment, dispatch unit 225 is configured to schedule (i.e., dispatch) instructions that are ready for performance and send the instructions to issue unit 230. In one embodiment, dispatch unit 225 is configured to maintain a schedule queue that stores a number of decoded and renamed instructions as well as information about the relative age and status of the stored instructions. For example, taking instruction dependency and age information into account, dispatch unit 225 may be configured to pick one or more instructions that are ready for performance.

Issue unit 230 may be configured to provide instruction sources and data to the various execution units for picked (i.e. scheduled or dispatched) instructions. In one embodiment, issue unit 230 includes reservation stations for storing instructions while waiting for their operands and/or for other processing resources to become available. In other embodiments, issue unit 230 provides instructions to reservation stations distributed among FGU 250, LSU 255, execution unit(s) 260, etc. In one embodiment, issue unit 230 is configured to read source operands from the appropriate source, which may vary depending upon the state of the pipeline. For example, if a source operand depends on a prior instruction that is still in the execution pipeline, the operand may be bypassed or forwarded directly from the appropriate execution unit result bus. Results may also be sourced from register files representing architectural (i.e., user-visible) as well as non-architectural state. In the illustrated embodiment, processor 200 includes a working register file 285 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units to be performed. In one embodiment, each of execution unit(s) 260 is similarly or identically configured to perform certain integer-type instructions defined in the implemented ISA, such as arithmetic, logical, and shift instructions. In some embodiments, architectural and non-architectural register files are physically implemented within or near execution unit(s) 260. It is contemplated that in some embodiments, processor 200 may include any number of integer execution units, and the execution units may or may not be symmetric in functionality.

LSU 255 may be configured as described above with reference to FIG. 1. Further, LSU 255 may be configured to process data memory references, such as integer and floating-point load and store instructions and other types of memory reference instructions. In the illustrated embodiment, LSU 255 includes data cache 265, load queue 270, and store queue 275. LSU 255 may be configured to detect misses in data cache 265 and to responsively request data from a cache or memory through cache/memory interface 280. In some embodiments, LSU 255 may implement a hardware prefetcher configured to predict and prefetch data that is likely to be used in the future, in order to increase the likelihood that such data will be resident in a data cache when it is needed.

In some embodiments, load queue 270 and store queue 275 are respectively configured to queue load and store instructions until their results can be committed to the architectural state of the processor. Instructions in the queues may be speculatively performed, non-speculatively performed, or waiting to be performed. Each queue may include a plurality of entries, which may store loads/stores in program order.

In various embodiments, LSU 255 may implement a variety of structures configured to facilitate memory operations. For example, LSU 255 may implement a data TLB to cache virtual data address translations. LSU 255 may also include hardware configured to support atomic load-store instructions, memory-related exception detection, and read and write access to special-purpose registers (e.g., control registers).

Floating-point/graphics unit (FGU) 250 may be configured to perform and provide results for certain floating-point and graphics-oriented instructions defined in the implemented ISA. For example, in one embodiment FGU 250 implements single- and double-precision floating-point arithmetic instructions compliant with the IEEE floating-point standards, such as add, subtract, multiply, divide, and certain transcendental functions.

In the illustrated embodiment, completion unit 235 includes reorder buffer (ROB) 240 and coordinates transfer of speculative results into the architectural state of processor 200. Entries in ROB 240 may be allocated in program order. Completion unit 235 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 240 before being committed to the architectural state of processor 200, and confirmed results may be committed in program order. Entries in ROB 240 may be marked as ready to complete when their results are allowed to be written to the architectural state. Completion unit 235 may also be configured to coordinate instruction flushing and/or replaying of instructions. "Flushing," as used herein, refers to removing an instruction from execution in a processor pipeline. Accordingly, execution of an instruction that is flushed is not completed. For example, an instruction may be flushed because it was speculatively fetched based on a mispredicted branch. "Replaying" or "retrying" as used herein, refers to re-performing a speculatively-performed or waiting instruction. For example, a speculatively-performed load from a particular location in memory may be re-performed in response to detecting a store to the particular location that is earlier in program order than the load. Replaying or retrying may occur after a flush or independently of a flush. Flushing and replaying may involve rewinding execution of an instruction. "Rewinding," as used herein, refers to undoing operations performed during execution of an instruction. For example, rewinding may include un-mapping physical registers and destination registers, marking results as invalid, removing entries from ROB 240, etc.

In one embodiment, completion unit 235 is configured to retire/remove some store instructions from ROB 240 and post them to store queue 275 before the store instructions have actually written their store-data. This may improve processing speed by allowing other instructions to retire instead of waiting for stores to complete. Stores may often complete slowly since they may wait for a write to a cache or memory and may require coherency checks. Posted store instructions may reside in store queue 275 until they have actually written their results (after completion unit 235 has determined that the store instructions have not caused any exceptions and dependencies are resolved). Thus, posted store instructions may not be considered completed until they are removed from store queue 275.

Figure 3:
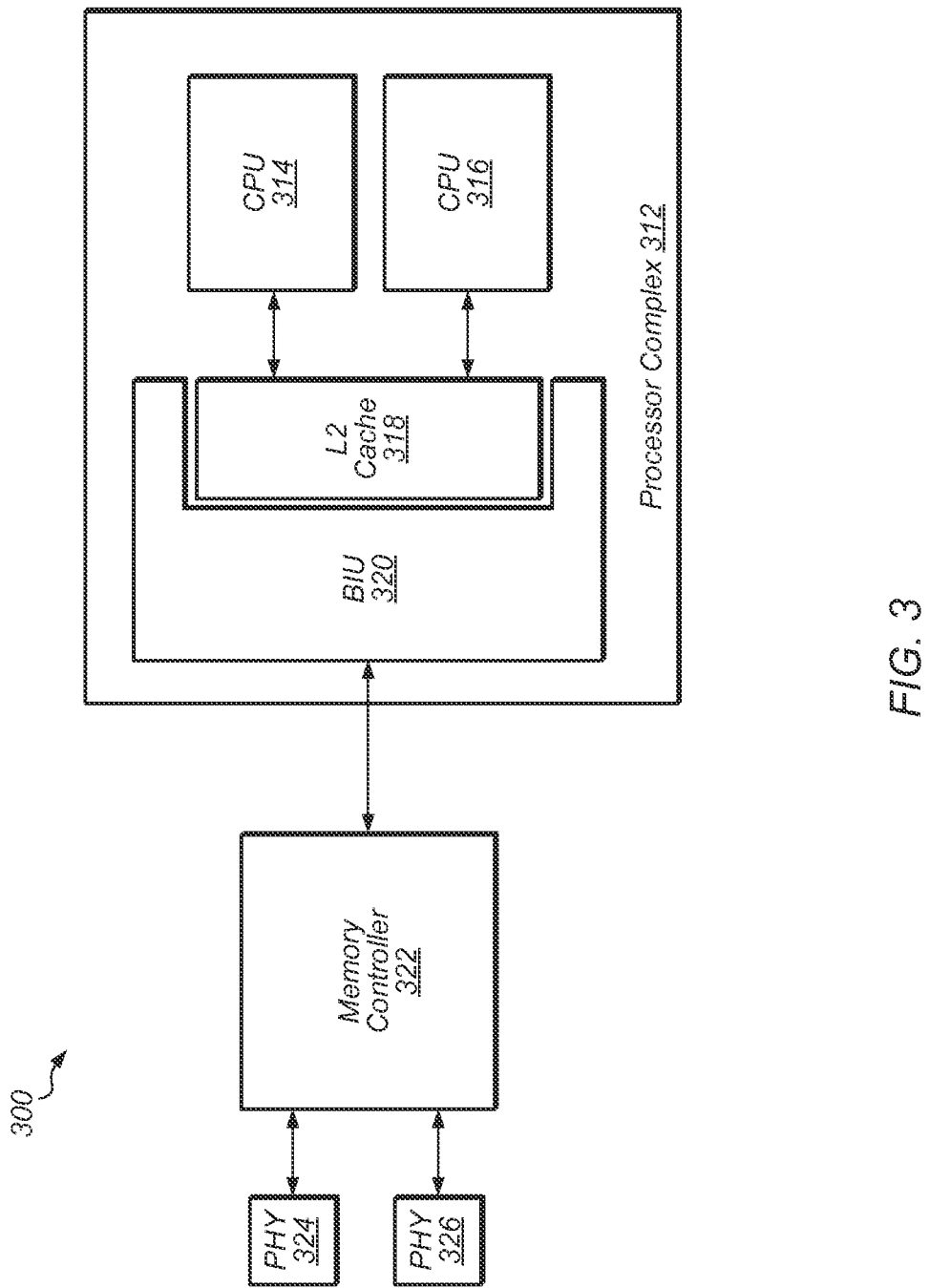
FIG. 3 is a block diagram illustrating one embodiment of a portion of an integrated circuit (IC).

Turning now to FIG. 3, a block diagram illustrating one embodiment of a portion of an integrated circuit (IC) is shown. In the illustrated embodiment, IC 300 includes a processor complex 312, memory controller 322, and memory physical interface circuits (PHYs) 324 and 326. It is noted that IC 300 may also include many other components not shown in FIG. 3. In various embodiments, IC 300 may also be referred to as a system on chip (SoC), an application specific integrated circuit (ASIC), or an apparatus.

Processor complex 312 may include central processing units (CPUs) 314 and 316, level two (L2) cache 318, and bus interface unit (BIU) 320. In other embodiments, processor complex 312 may include other numbers of CPUs. CPUs 314 and 316 may also be referred to as processors or cores. It is noted that processor complex 312 may include other components not shown in FIG. 3.

The CPUs 314 and 316 may include circuitry to execute instructions defined in an instruction set architecture. Specifically, one or more programs comprising the instructions may be executed by CPUs 314 and 316. Any instruction set architecture may be implemented in various embodiments. For example, in one embodiment, the ARM™ instruction set architecture (ISA) may be implemented. Other ISA's may include the PowerPC™ instruction set, the MIPS™ instruction set, the SPARC™ instruction set, the x86 instruction set (also referred to as IA-32), the IA-64 instruction set, etc. Other types of ISA's may also be utilized, including custom-designed or proprietary ISA's.

In one embodiment, each instruction executed by CPUs 314 and 316 may be associated with a program counter address (PC) value. Also, one or more architectural registers may be specified within some instructions for reads and writes. These architectural registers may be mapped to actual physical registers by a register rename unit. Furthermore, some instructions (e.g., ARM Thumb instructions) may be broken up into a sequence of instruction operations (or micro-ops), and each instruction operation of the sequence may be referred to by a unique micro-op (or uop) number.

Each of CPUs 314 and 316 may also include a level one (L1) cache (not shown), and each L1 cache may be coupled to L2 cache 318. Other embodiments may include additional levels of cache (e.g., level three (L3) cache). In one embodiment, L2 cache 318 may be configured to cache instructions and data for low latency access by CPUs 314 and 316. The L2 cache 318 may comprise any capacity and configuration (e.g. direct mapped, set associative). L2 cache 318 may be coupled to memory controller 322 via BIU 320. BIU 320 may also include various other logic structures to couple CPUs 314 and 316 and L2 cache 318 to various other devices and blocks.

Memory controller 322 may include any number of memory ports and may include circuitry configured to interface to memory. For example, memory controller 322 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 322 may also be coupled to memory physical interface circuits (PHYs) 324 and 326. Memory PHYs 324 and 326 are representative of any number of memory PHYs which may be coupled to memory controller 322. Memory PHYs 324 and 326 may be configured to interface to memory devices (not shown).

It is noted that other embodiments may include other combinations of components, including subsets or supersets of the components shown in FIG. 3 and/or other components. While one instance of a given component may be shown in FIG. 3, other embodiments may include two or more instances of the given component. Similarly, throughout this detailed description, embodiments that include only one instance of a given component may be used even if multiple instances are shown.

Figure 4:
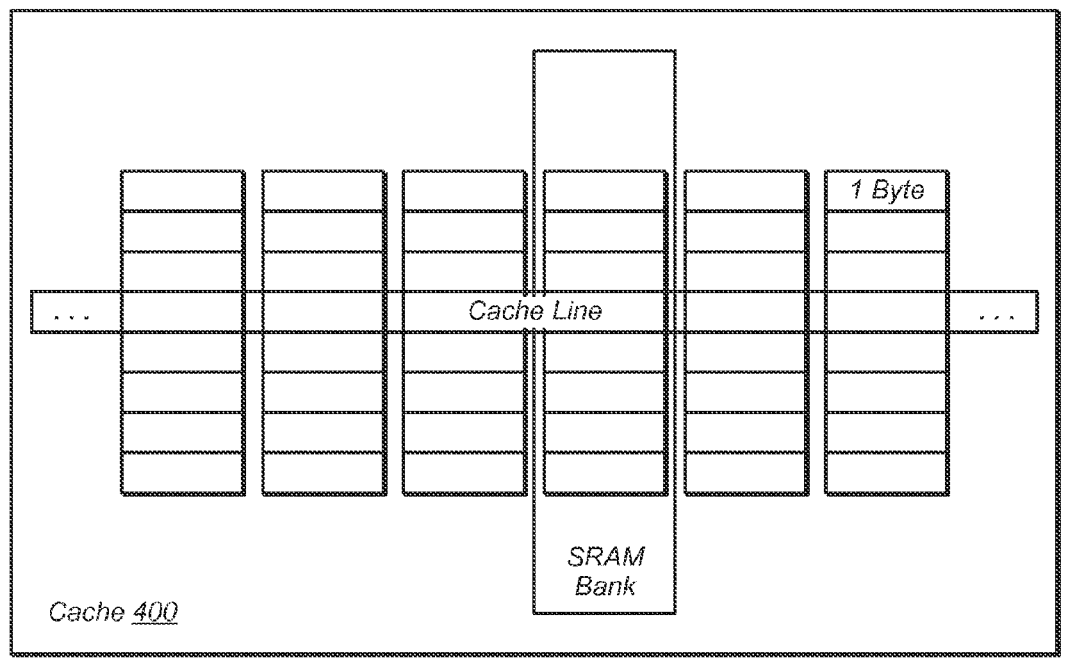
FIG. 4 is a block diagram illustrating one embodiment of a cache.

Turning now to FIG. 4, a block diagram of one embodiment of a cache is shown. In one embodiment, cache 400 may be utilized as cache 130 of FIG. 1. In other embodiments, cache 400 may be utilized as other types of caches within a system, processor, or apparatus. Cache 400 may utilize any type of storage element technology depending on the embodiment. For example, in one embodiment, cache 400 may utilize static random access memory (SRAM) modules for its storage elements.

Cache 400 may be a multi read-ported cache so as to handle multiple read requests concurrently. Multiple read ports for cache 400 coincide with a large number of physical banks in order to reduce load-load read conflict. Cache 400 includes multiple banks such that each cache line is broken down into multiple banks, and each bank may be accessed independently. The size of the bank may vary depending on the embodiment. In one embodiment, the size of the banks in cache 400 may be one byte.

Each bank shown in cache 400 may allow a single access (either read or write) in every cycle. However, a concurrent read and write request to the same bank can lead to data corruption. Accordingly, load and store operations to the same bank may be arbitrated and scheduled to avoid a conflict.

Figure 5:
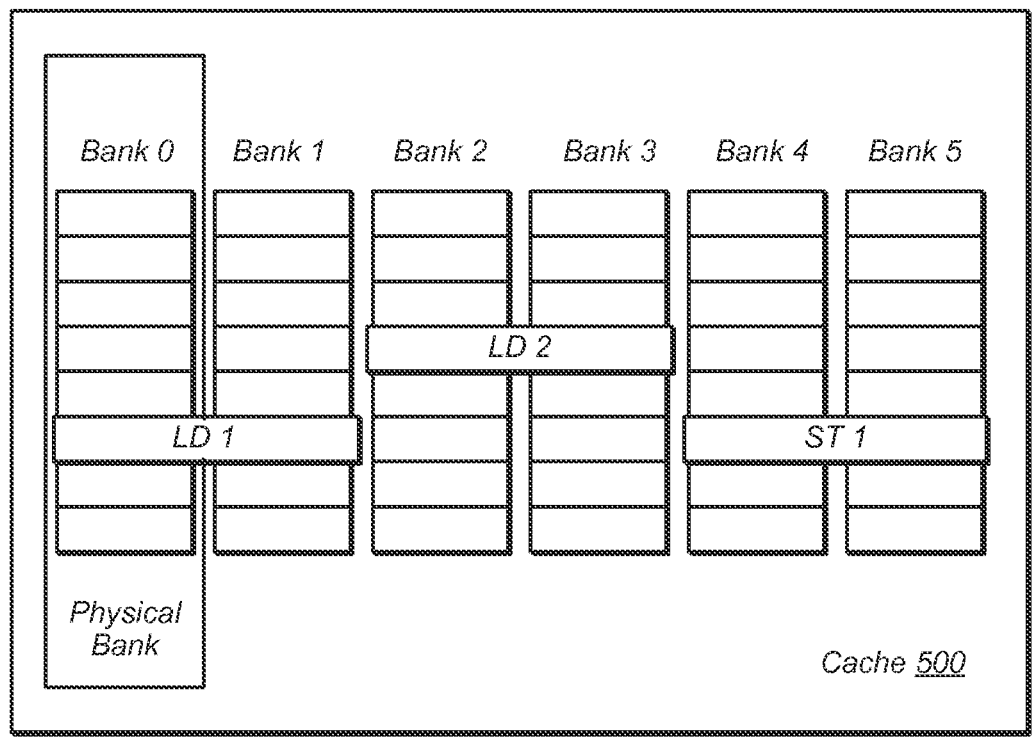
FIG. 5 is a block diagram illustrating one embodiment of supported concurrent memory operations.

Referring now to FIG. 5, a block diagram of one embodiment of allowed concurrent memory operations is shown. Three memory operations targeting cache 500 are shown in FIG. 5. These memory operations include Load 1 (LD 1), Load 2 (LD 2), and Store 1 (ST 1). Load 1 accesses banks 0 and 1, Load 2 accesses banks 2 and 3, and Store 1 access banks 4 and 5. Since none of these memory operations overlap with a separate memory operation, these three memory operations are allowed to access cache 500 simultaneously. While cache 500 is shown as having six banks in FIG. 5, it should be understood that cache 500 may have any number of banks, depending on the embodiment.

In one embodiment, cache 500 may be located within a load-store unit. Detection logic may be included as part of the load-store unit to detect whether concurrent memory operations conflict with each other. In one embodiment, the detection logic may be included within cache 500. In another embodiment, the detection logic may be located within the load-store unit and external to cache 500. In other embodiments, the detection logic may be located elsewhere within the host processor.

In one embodiment, a common flow for reading from cache 500 may be the following:

Load: <Generate Address>→<Decode Address>→<Locate physical bank(s) to read>→<Read bank>→<Write to register>

In one embodiment, a common flow for writing from cache 500 may be the following:

Store: <Get address from Store Queue>→<Decode Address>→<Locate physical bank(s) to write>→<Write bank(s)>

As the operating frequency of micro-processors continues to increase, and as the timing sensitivity of cache and memory accesses increases, it may be difficult to cancel a write operation late in case a concurrent read operation is found to collide on some of the banks in the two accesses. Accordingly, coarse scheduling techniques may be implemented in the processor micro-architecture.

One such technique involves stalling writes to the L1 data cache in the presence of loads irrespective of the physical banks being accessed. This technique serializes accesses of the L1 data cache for load and store operations. A second technique involves employing a coarse conflict detection scheme. A store operation may be dropped in case a conflict is perceived. The efficiency of this technique depends on the granularity at which collisions are detected. A third technique involves employing a precise conflict detection scheme in which a store operation is dropped in case of a true conflict. A fourth technique allows partial store writes to the L1 data cache opportunistically in the presence of loads.

Figure 6:
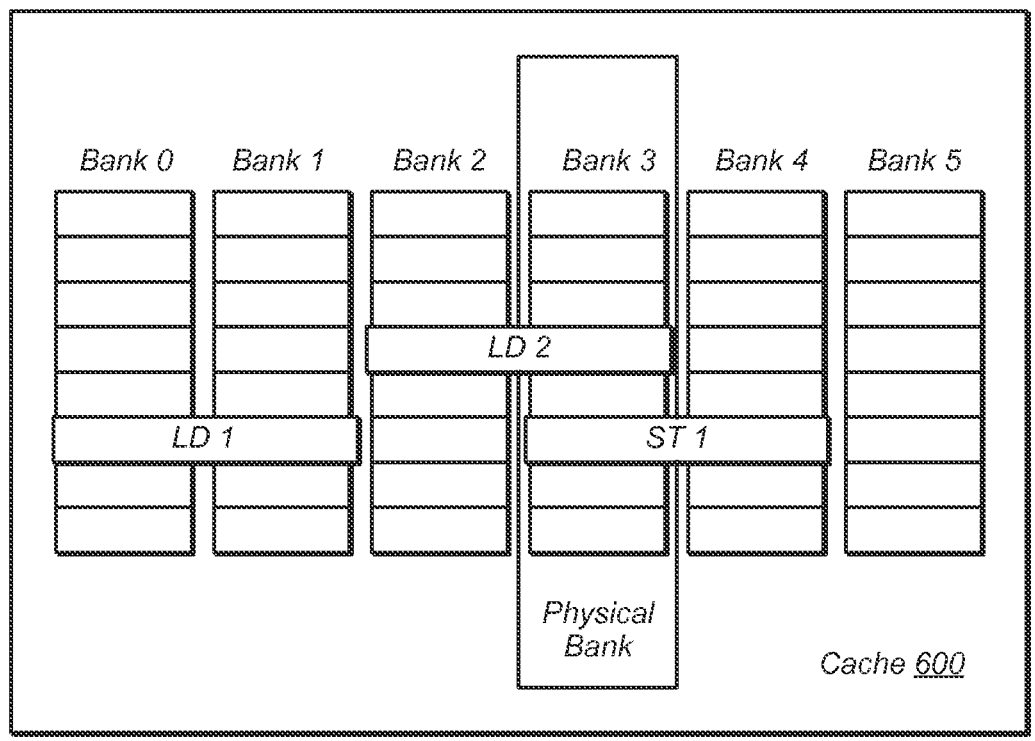
FIG. 6 is a block diagram illustrating one embodiment of conflicting memory operations.

Turning now to FIG. 6, a block diagram of one embodiment of conflicting memory operations is shown. Cache 600 is shown in FIG. 6 as including six banks. As previously noted, cache 600 may have any number of banks depending on the embodiment. The operations shown in FIG. 6 include Load 1, Load 2, and Store 1. Load 1 accesses banks 0 and 1, Load 2 accesses banks 2 and 3, and Store 1 accesses banks 3 and 4. Therefore, there is a conflict in bank 3 between Load 2 and Store 1, and these two operations are not allowed to access cache 600 in the same cycle.

One approach to deal with this conflict is to allow Load 2 to access cache 600 in a first clock cycle and then to allow Store 1 to access cache 600 in a subsequent clock cycle. However, this approach treats Store 1 as an all or nothing operation. Another approach would allow Store 1 to write to all banks of cache 600 for which there are no conflicts with other operations. For example, a partial write of Store 1 may be performed concurrently with Load 2. The partial write of Store 1 may be to bank 4 since there are no other concurrent operations to bank 4. A mask may be maintained corresponding to Store 1, and after the partial write, this mask may be updated to indicate that bank 4 was written but bank 3 still needs to be written.

In one embodiment, partial writes of store operations may be performed to a cache in the presence of loads. When a store has met memory ordering requirements, the store may be ready to write to the cache, and at this point, the store will attempt to write to the cache. If there are no concurrent loads trying to access the cache, then the store will complete in this attempt. If there are concurrent loads, the store will skip the write to all banks that have a conflict with loads. Banks that do not have a conflict with loads will get written by the store. This scheme allow for partial writes of stores in individual attempts.

In one embodiment, every store operation may have a mask to indicate the data portions which the store intends to write to the cache. The size of the mask may be based on the access size of the operation and the size of the bank. For example, in one embodiment, the size of a bank may be one byte, and the mask may be a byte-mask. In other embodiments, other bank sizes may be employed, and the size and structure of the mask may be adjusted accordingly. For every attempt to write a given store operation to the cache, the mask may be updated to clear the portions that did not have a bank conflict with a concurrent load and thus were successfully written. The given store operation may attempt to write to the cache on subsequent cycles but only for the portions that were not written in previous attempts. These portions that have yet to be written may be indicated by the values of corresponding indicators in the mask.

Using these techniques, a given store operation will be able to write all of its data to the cache in one or more attempts depending on the load operations that are flowing down the pipeline during those attempts. These techniques are tolerant to any intermittent stalls in the store pipeline, which may add cycles in between successive attempts. The mask indicates which portions of the given store operation were not written in a previous attempt, allowing only those portions that need to be written to be attempted in a successive cycle. The performance for load operations is unaffected by these techniques for making store operations more efficient.

Figure 7:
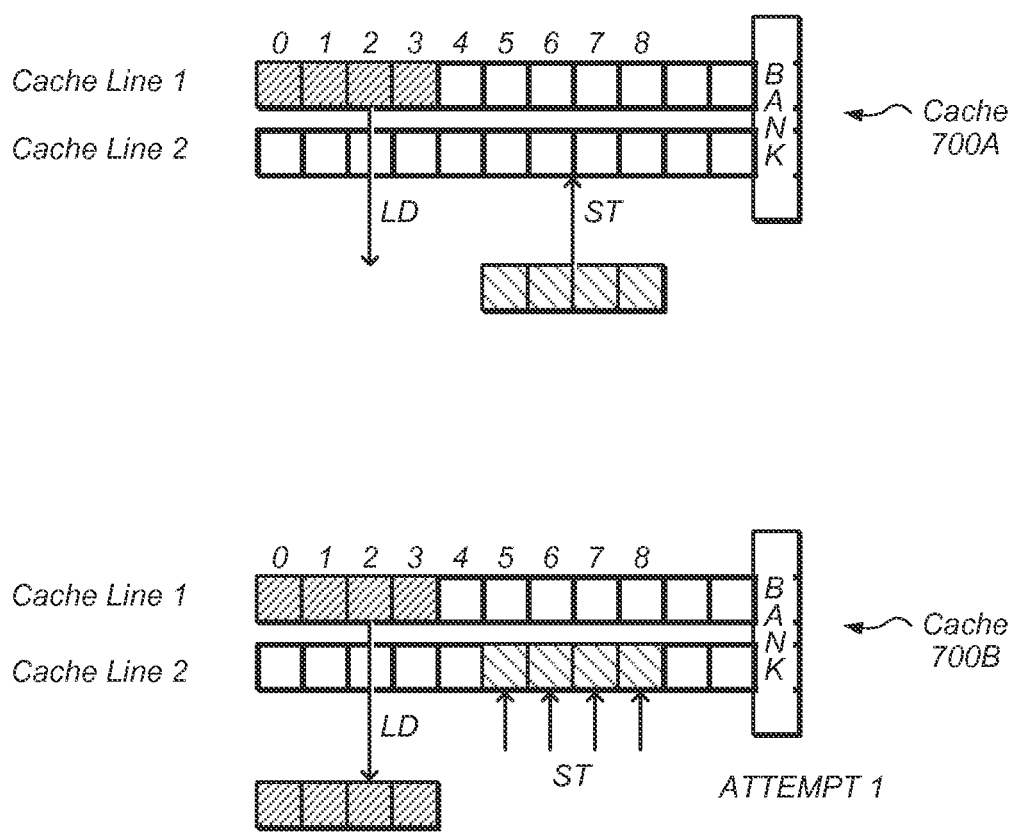
FIG. 7 is a block diagram illustrating one embodiment of non-conflicting load and store operations.

Referring now to FIG. 7, a block diagram of one embodiment of non-conflicting load and store operations is shown. As shown, the load and store access non-overlapping banks of cache 700A, allowing the load and store to access the cache concurrently. It is noted that the load operation targets a first cache line (Cache Line 1) and the store operation targets a second cache line (Cache Line 2). The load operation targets banks 0-3 of cache 700A while the store operation targets blocks 5-8. Therefore, the store operation will be able to write all of its portions to cache 700A in the first attempt. Cache 700B represents the cache after the load operation and store operation were implemented.

Figure 8:
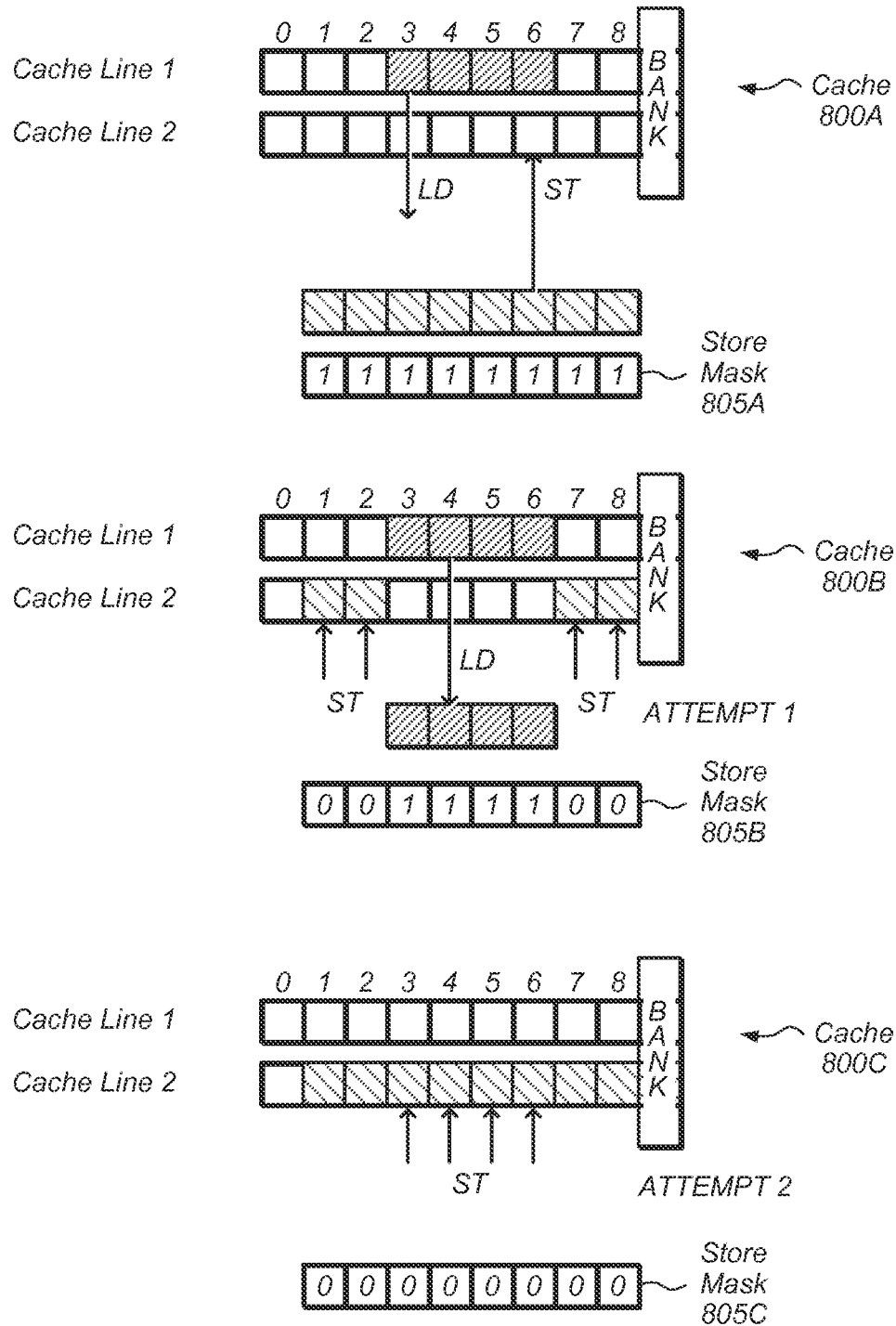
FIG. 8 is a block diagram illustrating one embodiment of conflicting load and store operations.

Turning now to FIG. 8, a block diagram of one embodiment of conflicting load and store operations is shown. The load operation targets banks 3-6 of a first cache line (Cache Line 1) of cache 800A while the store operation targets banks 1-8 of a second cache line (Cache Line 2) of cache 800A. Therefore, since there is a conflict between the load operation and the store operation, priority will be given to the load operation. Mask 805A represents the store operation mask before the first attempt to write the store operation to cache 800 is made. Mask 805A may have an indicator for each portion of the store operation, and each portion corresponds to a targeted bank of cache 800. As can be seen, prior to the store operation being written to cache 800A, all bits of mask 805A are set to '1' indicating that none of the data from the store operation has yet to be written to cache 800A.

In the first attempt to write the store operation, the store operation will write to those banks that do not have a conflict (banks 1-2 and 7-8) while simultaneously the load operation accesses banks 3-6. This is shown as "Attempt 1" for cache 800B in FIG. 8. After "Attempt 1", the mask for the store operation may be updated to indicate which banks have been written, and this is shown as mask 805B in FIG. 8. In one embodiment, the mask may include a bit for each portion of the store operation, wherein the portion size matches the size of a bank in cache 800. It is noted that the portions size and bank size may vary from embodiment to embodiment. The mask bits may be initialized to ones and then when a portion is successfully written, the corresponding mask bit may be cleared to zero. Alternatively, in another embodiment, the mask bits may be initialized to zeros and then when a portion is successfully written, the corresponding mask bit may be set to one.

On the second attempt, the unwritten portions of the store operation may be written to cache 800. The second attempt may occur on the subsequent clock cycle to the first attempt, or there may be one or more intervening clock cycles between the first attempt and the second attempt. The store queue and/or load-store unit control logic may determine which portions are unwritten based on mask 805B. As shown in FIG. 8, on "Attempt 2", the remaining unwritten portions of the store operation are written to cache 800C. It is assumed for the purposes of this discussion that there were no load operations which conflicted with the store operation on Attempt 2. If there had been a load operation which conflicted with one or more portions of the store operation, then any portions of the store operation which did not have a bank conflict with the load operation would get written to cache 800 and then a third attempt may be performed on a subsequent clock cycle for any remaining unwritten portions of the store operation. After Attempt 2, the mask may be updated to indicate all of the data for the store operation has been written to cache 800, as shown in mask 805C.

In between the first and second attempts to write the store operation to cache 800B-C, 'Cache Line 2' does not have a full cache line of valid data. However, the data in Cache Line 2 in combination with the store queue entry corresponding to the store operation has the full cache line of valid data. Any of various operations may be serviced while Cache Line 2 does not have a full cache line of up-to-date data using both the data in cache line 2 and the data in the store queue entry.

For example, a load trying to read from the partially written Cache Line 2 may merge data from Cache Line 2 and the store queue (not shown) while giving priority to the store queue data. In one embodiment, the load may utilize mask 805B to determine which data should be read from Cache Line 2 and which data should be read from the store queue. Alternatively, the load may wait until the store has successfully written all of its data to Cache Line 2 before executing the load.

In another example, an eviction of Cache Line 2 of cache 800B due to a fill from a higher level cache may read out data from Cache Line 2 and merge this data with data from the store queue. In this case, the data from the store queue may be prioritized over the data from Cache Line 2. In a further example, cache 800B may be a L1 data cache of a first processor in a multi-processor system, and a second processor may request access to Cache Line 2. In this example, cache 800B may be snooped to allow the second processor access to Cache Line 2. Since Cache Line 2 is dirty, Cache Line 2 will be provided to the second processor. The store queue may be read along with Cache Line 2 and the data may be merged before being sent to the second processor. As in the other examples, the store queue data may be prioritized over the data from Cache Line 2 during the merge so as to provide the latest data.

Figure 9:
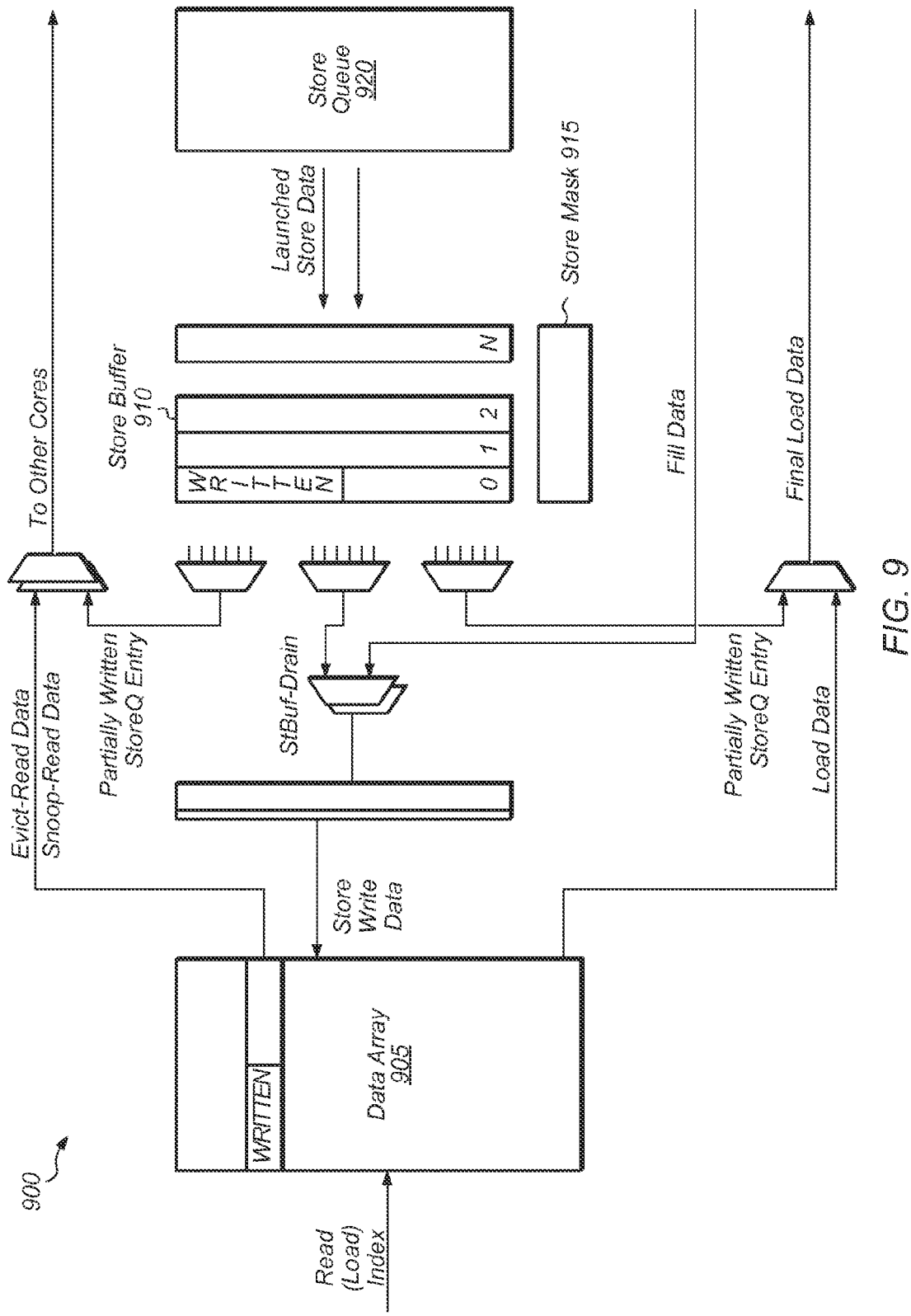
FIG. 9 is a block diagram illustrating one embodiment of a portion of a load-store unit (LSU).

Referring now to FIG. 9, a block diagram of one embodiment of a portion of a load-store unit (LSU) 900 is shown. LSU 900 includes store queue 920 for storing store operations which are waiting to write data to data array 905. In one embodiment, data array 905 may be a data array of a level one (L1) data cache. Store data may be launched from store queue 920 to store buffer 910. Store buffer 910 may have any number 'N' of entries for storing store operations. As shown in FIG. 9, entry '0' of store buffer 910 includes a store operation which has been partially written to data array 905. It may be assumed for the purposes of this discussion that this store operation conflicted with a load operation on a portion of the banks of data array 905, which caused only a portion of the store data to be written to data array 905.

Store mask 915 may include indicators which specify which data from this store operation still need to be written to data array 905 on a subsequent clock cycle. In one embodiment, store mask 915 may include a single entry for the next scheduled store operation stored in store buffer 910. In another embodiment, store mask 915 may include multiple entries for multiple store operations stored in store buffer 910.

If a subsequent load operation hits on the partially written cache line of data array 905, the data for this load operation may be provided by a merge of the data from the partially written cache line and the data from the corresponding store queue entry. This merged data is shown as "Final Load Data" in FIG. 9. Similarly, if data is evicted from the partially written cache line, the partial data from data array 905 may be merged with data from the corresponding store queue entry and sent to a higher level cache (e.g., L2 cache) or memory. Also, if the partially written cache line is snooped from another core, the partial data from data array 905 may be merged with data from the corresponding store queue entry and sent to the other core.

Performing stores opportunistically in the presence of loads allows for a faster drain of stores from store queue 920 by breaking down the need to detect address conflicts between stores and same cycle loads to physical bank granularity. For example, a given store operation may conflict with back-to-back load operations, and typically the given store operation may wait until the back-to-back load operations are performed before being written to data array 905. However, in some scenarios, the given store operation may be split up into two partial store operations such that each partial store operation may be performed concurrently with one of the load operations without a bank conflict. In this way, while the load operations are being performed in two clock cycles, the given store operation may be able to be performed a portion at a time in these two clock cycles, resulting in a faster completion of the given store operation.

For example, in one scenario, a first store operation may be ready to access banks 0-7 of data array 905 in a first clock cycle, a first load operation may be ready to access banks 0-3 in a first clock cycle, and a second load operation may target banks 4-7 of data array 905 in a second clock cycle, wherein the second clock cycle is subsequent to the first clock cycle. When the first load operation accesses banks 0-3 in the first clock cycle, the portion of the first store operation targeting banks 4-7 may be performed concurrently with the first load operation in the first clock cycle. Then, when the second load operation accesses banks 4-7 in the second clock cycle, the portion of the first store operation targeting banks 0-3 may be performed concurrently with the second load operation in the second clock cycle. In this scenario, the first store operation is drained more quickly from store queue 920 than if it were to wait to access data array 905 as a single, all-or-nothing operation. By enabling a faster drain of stores from store queue 920, store queue 920 can be sized smaller than would otherwise be possible. A store queue entry in store queue 920 may have storage for data, address, and various read ports and cam ports. Increasing the size of store queue 920 can be expensive with respect to hardware requirements, timing impact, and power usage.

Figure 10:
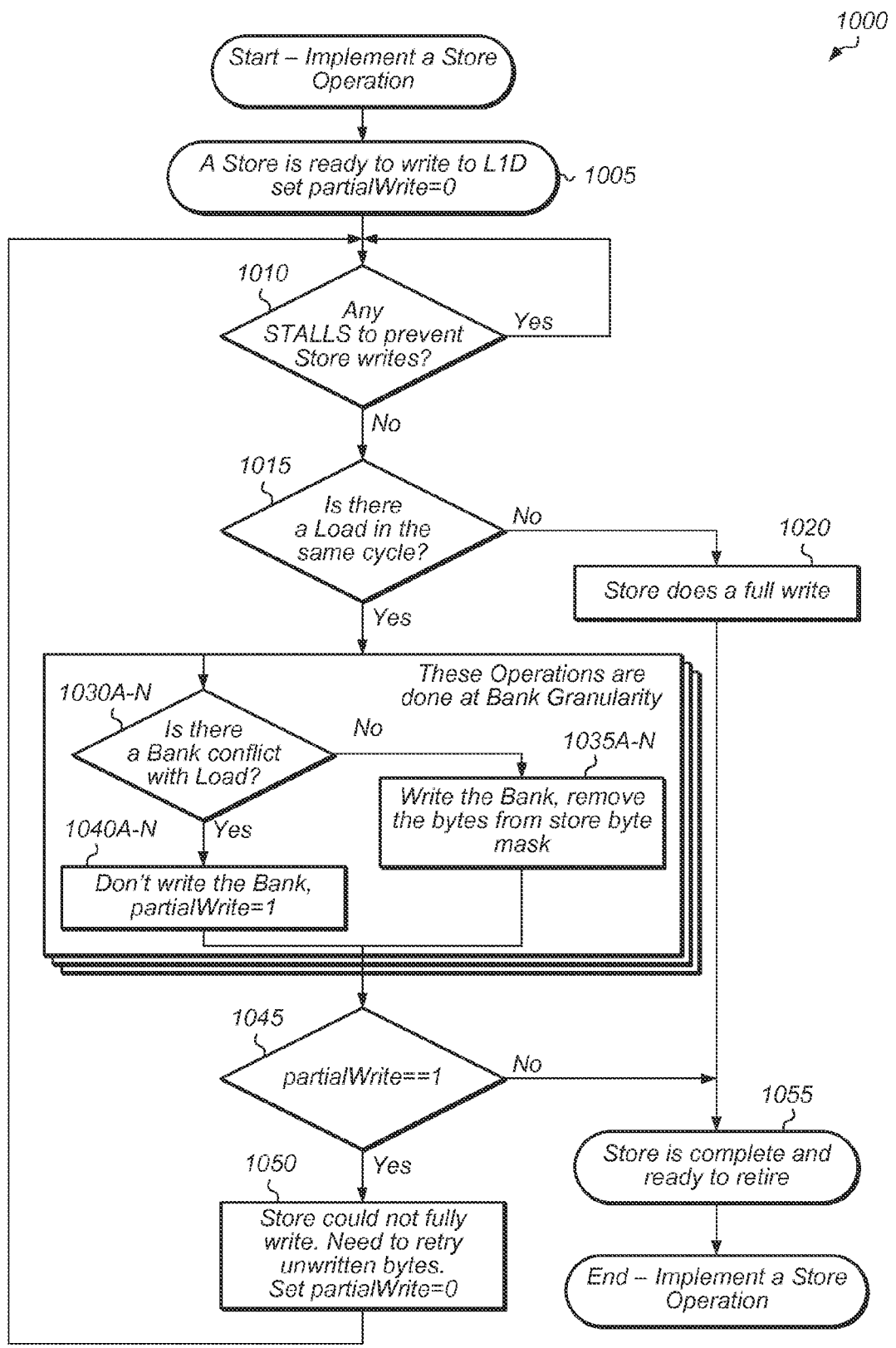
FIG. 10 is a generalized flow diagram illustrating one embodiment of a method for allowing partial store writes opportunistically in the presence of loads.

Referring now to FIG. 10, one embodiment of a method 1000 for allowing partial store writes opportunistically in the presence of loads is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Blocks may be performed in parallel in combinatorial logic circuitry in any of the load-store units and/or processors described herein. Blocks, combinations of blocks, and/or the flowchart as a whole may be pipelined over multiple clock cycles.

In one embodiment, a store may be ready to write to the L1 data cache (block 1005). As part of initializing the store, a partial-write indicator corresponding to the store may be set to 0. The store may be buffered in the store queue until the store is ready to be written to the L1 data cache. Next, it may be determined if there are any events that would stall the store pipeline and prevent the store from writing to the L1 data cache (conditional block 1010). Various events may cause a stall, such as the processor pipeline being redirected, a branch misprediction, a pipeline flush, an exception, or other events. If there is a stall that prevents the store from writing to the L1 data cache (conditional block 1010, "yes" leg), then method 1000 may remain at conditional block 1010 until the stall clears. If there are no stalls to prevent the store from writing to the L1 data cache (conditional block 1010, "no" leg), then the load-store unit (LSU) control logic may determine if there is a load trying to read from the L1 data cache in the same cycle (conditional block 1015).

If there are no loads trying to read from the L1 data cache in the same cycle (conditional block 1015, "no" leg), then the store may perform a full write to the L1 data cache (block 1020). After block 1020, the store is complete and ready to retire (block 1055). If there is a load trying to read from the L1 data cache in the same cycle (conditional block 1015, "yes" leg), then the control logic may determine if the store has a bank conflict with the load on a bank-by-bank basis (conditional blocks 1030A-N). Each block 1030A-N represents each bank of the L1 data cache which is targeted by the store, with the number of banks varying depending on the embodiment. Similarly, blocks 1035A-N and blocks 1040A-N are performed at bank granularity for each bank of the L1 data cache which is targeted by the store.

For each bank targeted by the store, if there is a bank conflict with the load (conditional block 1030A-N, "yes" leg), then the bank is not written by the store and the partial-write indicator is set to '1' (block 1040A-N). If there is not a bank conflict with the load (conditional block 1030A-N, "no" leg), then the bank may be written by the store and the bytes may be removed from the corresponding store byte mask (block 1035A-N). After blocks 1035A-N and blocks 1040A-N, the control logic may determine if the partial-write indicator is set to '1' (conditional block 1045).

If the partial-write indicator is set to '1' (conditional block 1045, "yes" leg), then the store needs to retry to write the unwritten bytes and the partial-write indicator may be reset to '0' (block 1050). After block 1050, method 1000 may return to block 1010 to attempt to write the store data which was not written during the previous write attempt. Depending on the scenario and the number of concurrent, conflicting load operations, method 1000 may be executed multiple times for a single store operation, performing multiple partial writes until all of the data of the store operation has been written to the L1 data cache. If the partial-write indicator is set to '0' (conditional block 1045, "no" leg), then the store is complete and ready to retire (block 1055). After block 1055, method 1000 may end.

Figure 11:
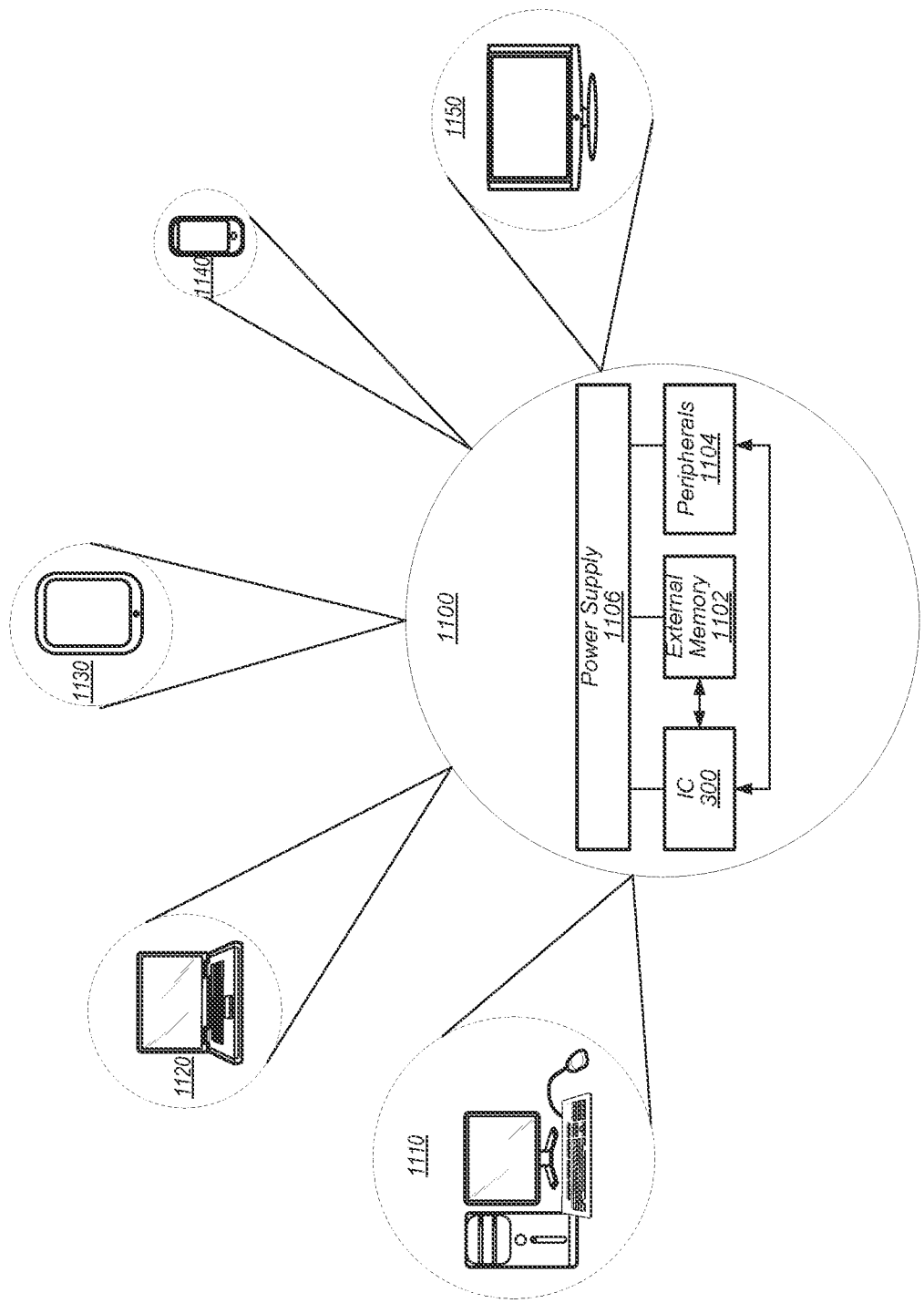
FIG. 11 is a block diagram of one embodiment of a system.

Turning next to FIG. 11, a block diagram of one embodiment of a system 1100 is shown. As shown, system 1100 may represent chip, circuitry, components, etc., of a desktop computer 1110, laptop computer 1120, tablet computer 1130, cell phone 1140, television 1150 (or set top box configured to be coupled to a television), or otherwise. In the illustrated embodiment, the system 1100 includes at least one instance of IC 300 (of FIG. 3) coupled to an external memory 1102.

IC 300 is coupled to one or more peripherals 1104 and the external memory 1102. A power supply 1106 is also provided which supplies the supply voltages to IC 300 as well as one or more supply voltages to the memory 1102 and/or the peripherals 1104. In various embodiments, power supply 1106 may represent a battery (e.g., a rechargeable battery in a smart phone, laptop or tablet computer). In some embodiments, more than one instance of IC 300 may be included (and more than one external memory 1102 may be included as well).

The memory 1102 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

The peripherals 1104 may include any desired circuitry, depending on the type of system 1100. For example, in one embodiment, peripherals 1104 may include devices for various types of wireless communication, such as wifi, Bluetooth, cellular, global positioning system, etc. The peripherals 1104 may also include additional storage, including RAM storage, solid state storage, or disk storage. The peripherals 1104 may include user interface devices such as a display screen, including touch display screens or multitouch display screens, keyboard or other input devices, microphones, speakers, etc.

Figure 12:
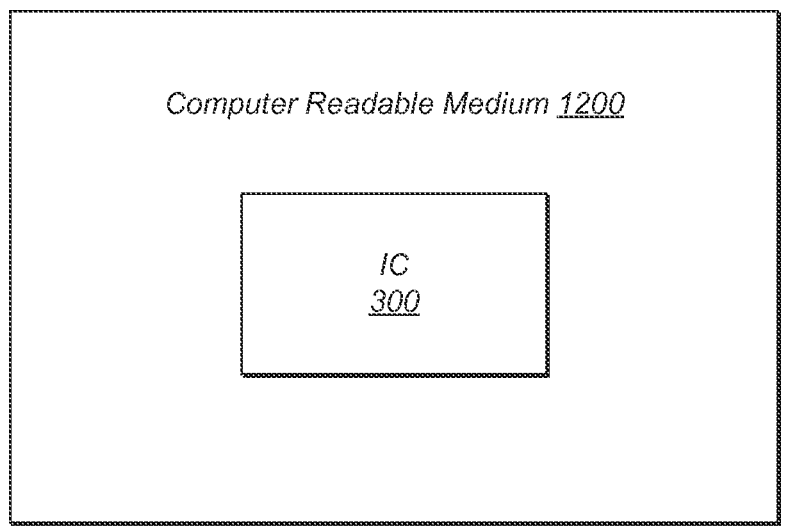
FIG. 12 is a block diagram of one embodiment of a computer readable medium.

Referring now to FIG. 12, one embodiment of a block diagram of a computer readable medium 1200 including one or more data structures representative of the circuitry included in IC 300 (of FIG. 3) is shown. Generally speaking, computer readable medium 1200 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 1200 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 1200 may be the netlist(s) (with or without the synthesis library) or the data set(s), as desired. In yet another alternative, the data structures may comprise the output of a schematic program, or netlist(s) or data set(s) derived therefrom.

While computer readable medium 1200 includes a representation of IC 300, other embodiments may include a representation of any portion or combination of portions of IC 300 (e.g., load-store unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a cache comprising a plurality of banks, wherein each bank of the plurality of banks can be accessed independently of other banks;
   wherein the processor is configured to:
      detect that a first store operation of data conflicts with a first load operation in a first clock cycle in at least one bank of the cache;
      perform a first partial write of a first portion of the data to the cache in the first clock cycle, wherein the first portion of the data is less than all of the data;
      perform the first load operation by reading from the cache in the first clock cycle;
      delay a second partial write of a second portion of the data to the cache until a subsequent clock cycle, wherein the second portion of the data conflicts with the first load operation;
      maintain a first mask for each portion of a plurality of portions of the first store operation; and
      update the first mask to indicate the first portion of the first store operation has been written to the cache in the first clock cycle.

2. The processor as recited in claim 1, wherein the cache comprises a plurality of cache lines, wherein the first store operation targets a first cache line, wherein the first load operation targets a second cache line, and wherein the first cache line is different than the second cache line.

3. The processor as recited in claim 2, further comprising a store queue configured to buffer store operations that target locations in the cache, wherein the first store operation is buffered in the store queue until the first store operation is written in its entirety to the cache.

4. The processor as recited in claim 3, wherein prior to performing the second partial write of the second portion of the first store operation to the first cache line, the processor is configured to:
   detect that a second load operation is scheduled to read data from the first cache line;
   merge the second portion of the first store operation in the store queue with the first portion of the first store operation from the first cache line; and
   provide the merged data for the second load operation.

5. The processor as recited in claim 3, wherein prior to performing the second partial write of the second portion of the first store operation to the first cache line, the processor is further configured to:
   detect that a first snoop operation targets the first cache line;
   merge the second portion of the first store operation in the store queue with the first portion of the first store operation from the first cache line; and
   provide the merged data for the first snoop operation.

6. The processor as recited in claim 3, wherein prior to performing the second partial write of the second portion of the first store operation to the first cache line, the processor is further configured to:
   evict the first cache line from the cache;
   merge the second portion of the first store operation in the store queue with the first portion of the first store operation from the first cache line; and
   write back the merged data to a higher level cache.

7. A load-store unit (LSU) comprising:
   a load queue;
   a store queue; and
   a cache, wherein the cache comprises a plurality of cache lines, and wherein each cache line of the plurality of cache lines comprises a plurality of banks;
   wherein the LSU is configured to:
      detect a conflict for access to the cache between a first store operation of data and a first load operation in a first clock cycle;
      responsive to detecting the conflict for access to the cache between the first store operation and the first operation in the first clock cycle:
         write a first portion of the data to the cache in the first clock cycle, wherein the first portion of the data is less than all of the data;
         perform the first load operation in the first clock cycle; and
         delay a second partial write of a second portion of the data to the cache until a subsequent clock cycle;
      wherein the first portion of the first store operation targets one or more first banks of the cache, wherein the second portion of the first store operation targets one or more second banks of the cache, and wherein the first load operation targets the one or more second banks of the cache; and
      wherein the LSU comprises a store mask, and wherein the LSU is further configured to update the store mask to indicate the first portion of the first store operation has been written to the cache in the first clock cycle.

8. The LSU as recited in claim 7, wherein the LSU is further configured to utilize the store mask to determine which portions of the first store operation to write to the cache on a subsequent clock cycle.

9. The LSU as recited in claim 7, wherein the LSU is further configured to:
   perform a second load operation in a second clock cycle, wherein the second load operation targets at least one of the one or more first banks of the cache, and wherein the second clock cycle is subsequent to the first clock cycle; and write the second portion of the first store operation to the one or more second banks of the cache in the second clock cycle responsive to determining the second load operation does not target any of the one or more second banks of the cache.

10. The LSU as recited in claim 7, wherein the first store operation targets a first cache line of the cache, wherein the first load operation targets a second cache line of the cache, and wherein the first cache line is different than the second cache line.

11. The LSU as recited in claim 9, wherein the first and second portions of the first load operation are the first load operation in its entirety.

12. A method comprising:

maintaining a first mask for a first store operation of data, wherein the first store operation is stored in a store queue, wherein the first store operation targets a location of a first cache line of a cache, and wherein the first mask indicates which portions of the first store operation have been written to the first cache line;

writing only a first portion of the data to the first cache line in a first clock cycle responsive to detecting a conflict with a first load operation in the first clock cycle for one or more other portions of the first store operation, wherein the first portion of the data is less than all of the data; and updating the first mask to indicate that the first portion has been written to the first cache line.

13. The method as recited in claim 12, further comprising writing the one or more other portions of the first store operation to the first cache line in a subsequent clock cycle responsive to determining there are no conflicts with concurrent load operations in the subsequent clock cycle.

14. The method as recited in claim 12, further comprising:

writing a second portion of the first store operation to the first cache line in a second clock cycle responsive to determining there are no conflicts between the second portion of the first store operation and any concurrent load operations, wherein the second clock cycle is subsequent to the first clock cycle;

updating the first mask to indicate that the second portion has been written to the first cache line; and delaying writing of a third portion of the first store operation to the first cache line in the second clock cycle responsive to determining there is a conflict between the third portion of the first store operation and one or more concurrent load operations during the second clock cycle.

15. The method as recited in claim 14, further comprising:

detecting a second load operation targeting the first cache line prior to writing the first store operation in its entirety to the first cache line;

merging data from the first cache line with data from the first store operation in the store queue; and providing the merged data for the second load operation.

16. The method as recited in claim 15, further comprising utilizing the first mask to determine which portions of the first store operation in the store queue to provide for the second load operation and which portions of the first cache line to provide for the second load operation.

17. The method as recited in claim 14, further comprising:

attempting to write the first store operation to the first cache line in a third clock cycle, wherein the third clock cycle is subsequent to the second clock cycle; and utilizing the first mask to determine which portions of the first store operation should be written to the first cache line in the third clock cycle.

* * * * *